(12) United States Patent
Bergen

(10) Patent No.: US 10,393,390 B2
(45) Date of Patent: Aug. 27, 2019

(54) OVEN SHELF

(71) Applicant: I.C.B. NV, Scherpenheuvel-Zichem (BE)

(72) Inventor: Johan Bergen, Scherpenheuvel-Zichem (BE)

(73) Assignee: I.C.B. NV, Scherpenheuvel-Zichem (BE)

( * ) Notice: Subject to any disclaimer, the term of this patent is extended or adjusted under 35 U.S.C. 154(b) by 0 days.

(21) Appl. No.: 15/521,523

(22) PCT Filed: Oct. 23, 2015

(86) PCT No.: PCT/EP2015/074592
§ 371 (c)(1),
(2) Date: Apr. 24, 2017

(87) PCT Pub. No.: WO2016/066541
PCT Pub. Date: May 6, 2016

(65) Prior Publication Data
US 2017/0314786 A1    Nov. 2, 2017

(30) Foreign Application Priority Data

Oct. 28, 2014 (BE) .................................. 2014/5033

(51) Int. Cl.
*A47J 37/06* (2006.01)
*F24C 15/16* (2006.01)

(52) U.S. Cl.
CPC ........... *F24C 15/16* (2013.01); *A47J 37/0694* (2013.01)

(58) Field of Classification Search
CPC ................................. F24C 15/16; A47J 37/06

USPC ...................................................... 126/337 A
See application file for complete search history.

(56) References Cited

U.S. PATENT DOCUMENTS 1,706,516 A    3/1929  Bennett
6,976,597 B2*  12/2005 Jahrling ............... F24C 15/168
                                             211/153
8,827,232 B2*  9/2014  Crowley ............... A47B 43/003
                                             211/175

(Continued)

FOREIGN PATENT DOCUMENTS

CA       2538491 A1     9/2007
DE    WO 9947863 A1 *   9/1999 ............. A21B 3/155

(Continued)

OTHER PUBLICATIONS

International Search Report (ISR) dated Jan. 25, 2016, for PCT/EP2015/074592.

(Continued)

*Primary Examiner* — Avinash A Savani
*Assistant Examiner* — Aaron H Heyamoto
(74) *Attorney, Agent, or Firm* — Bacon & Thomas, PLLC

(57) ABSTRACT

Oven shelves which can be disassembled and, if desired, fit into ovens having different dimensions. The oven shelves include a sheet having a non-stick layer. The sheet has a loop-shaped border along the length on two opposite sides, into which loop-shaped border the rods (longitudinal rods) fit. Transverse rods are located between the longitudinal rods and ensure that the sheet is tensioned. A support element is optionally provided under the sheet during use.

16 Claims, 6 Drawing Sheets

(56) References Cited

U.S. PATENT DOCUMENTS

2004/0112371 A1* 6/2004 Le ............................ F24C 15/16
126/334
2013/0118475 A1* 5/2013 Armstrong .............. F24C 15/16
126/337 R

FOREIGN PATENT DOCUMENTS

GB      2175196 A    11/1986
WO   2006112026 A1  10/2006

OTHER PUBLICATIONS

Written Opinion dated Jan. 25, 2016, for PCT/EP2015/074592.
Belgian Search Report dated Jul. 6, 2015, for BE 2014-05033.
International Preliminary Report on Patentability (IPRP) dated May 2, 2017, for PCT/EP2015/074592.

* cited by examiner

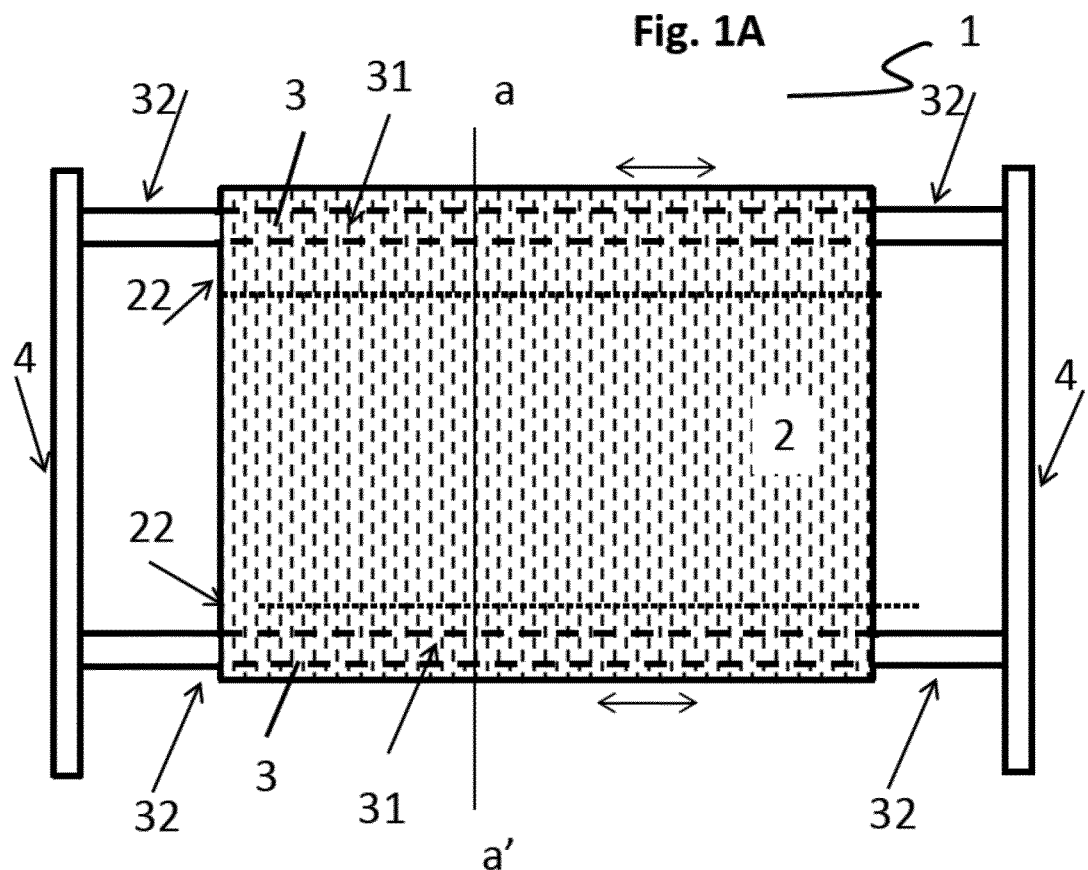
Fig. 1A
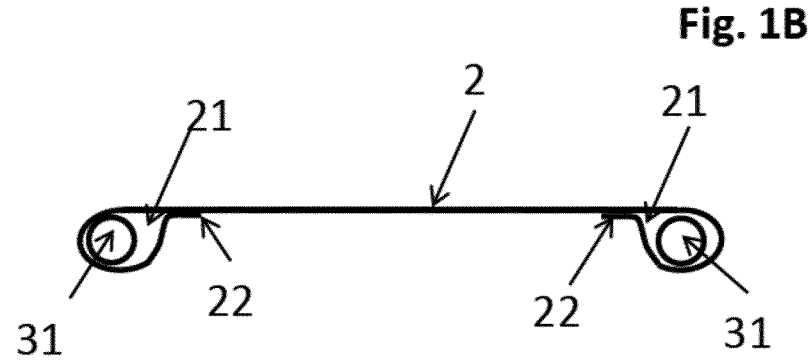
Fig. 1B
Figure 1

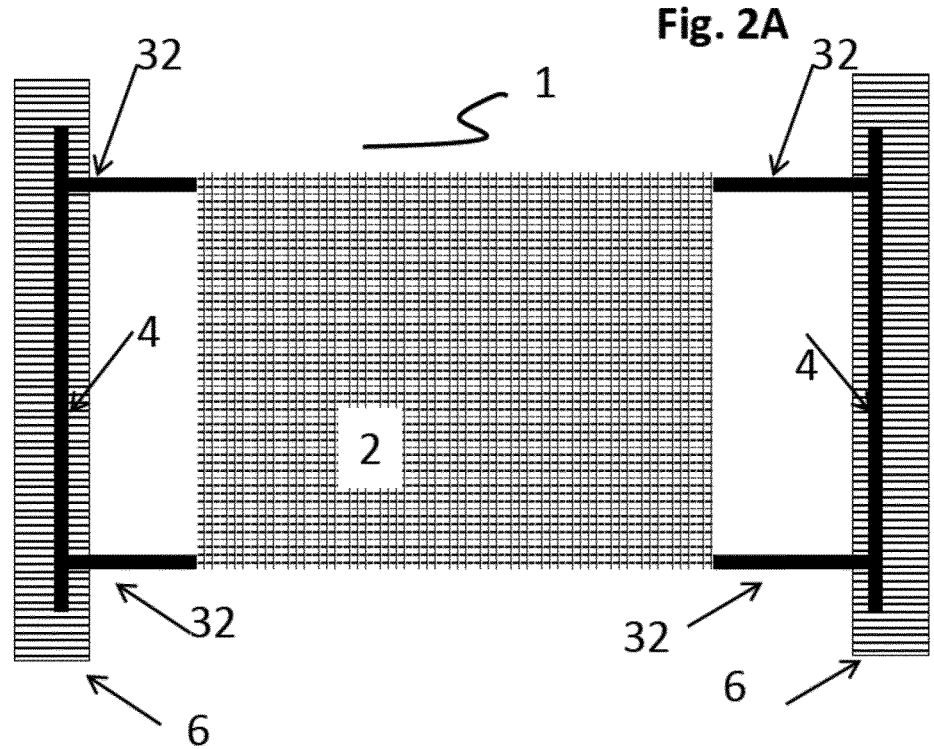
Fig. 2A
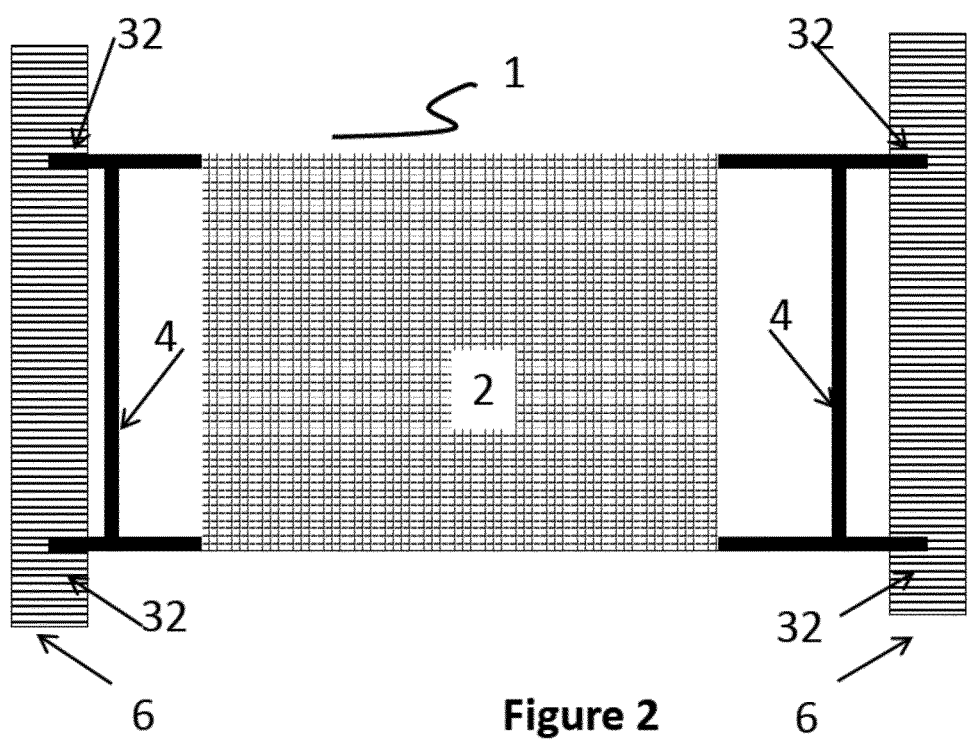
Fig. 2B
Figure 2

OVEN SHELF

The present invention relates to oven shelves of variable size and which can be disassembled after use.

BACKGROUND OF THE INVENTION

When purchased, ovens contain one or more oven shelves, the width of which is determined by the internal dimensions of the oven. If one has a number of ovens, it is frequently the case that the dimensions differ and oven shelves cannot be used in different ovens. There is therefore a demand for oven shelves which can be used in different types of oven.

When preparing food which takes up little space, for example biscuits, it is desirable to use several oven shelves in the same oven. However, when purchased, an oven has only a certain number and type of oven shelves. Additional oven shelves which take up little space after use are helpful in this case.

There are adjustable oven shelves where the metal baking shelf itself is adjustable in size or where a metal baking shelf with fixed dimensions is located on an adjustable frame so that the frame can be adapted to the dimensions of the oven. Just as a conventional oven shelf, this type of adjustable shelf takes up a lot of space when it is not being used. Furthermore, these shelves cannot usually be used in a microwave oven.

SUMMARY OF THE INVENTION

The present invention provides products and methods which make it possible to assemble an oven shelf which can be disassembled again after use. Moreover, the width of the oven shelf can be adapted so that it fits into ovens of differencing size.

An aspect of the invention relates to kits for assembling an oven shelf (1) which can be disassembled once again after use. Such kits comprise:
  a rectangular sheet (2) of a heat-resistant woven cloth covered or impregnated with a non-stick layer, which has a loop-shaped border (21) along the length on two opposite sides,
  two heat-resistant longitudinal rods (3) which fit into the loop-shaped borders (21) of the sheet (2), and
  at least two heat-resistant transverse rods (4) which removably fit onto the ends (32) of the longitudinal rods (3) wherein the rods are of a suitable length or have a tensioning mechanism such that the rectangular sheet (2) is tensioned upon assembly. The fitting of the rods occurs with the very ends of the rods engage with each other as shown in FIG. 4a, or the end of one rods fits close to the end of another rod as shown in FIGS. 2 a and b.

In certain embodiments, the longitudinal rods (3) are adjustable in length.

In certain embodiments, the longitudinal rods (3) and/or transverse rods (4) are made of a non-ferrous metal.

In certain embodiments, longitudinal rods (3) and/or transverse rods (4) are made of rustproof metal or aluminium.

In specific embodiments the sheet is porous or the sheet is an open fibre based mesh.

In other specific embodiment, the transverse rods (4) have a U-shaped bend, whereby the end of this bend is positioned under the sheet (2).

In further specific embodiments, the kits comprise one or more support elements (5) which are located under the sheet (2) during use of the shelf and rest on or are connected to the transverse rods (4).

A further aspect of the invention relates to assembled oven shelves (1). Such oven shelves comprise:
  a rectangular sheet (2) of a heat-resistant woven cloth covered or impregnated with a non-stick layer, which has a loop-shaped border (21) along the length on two opposite sides,
  two heat-resistant longitudinal rods (3) which are located in the loop-shaped borders (21) of the sheet (2), and the ends (32) of which protrude from the sheet (2), and
  two or more heat-resistant transverse rods (4) which removably fit onto the ends (32) of the longitudinal rods (3), wherein the transverse rods (4) are of a suitable length or have a tensioning mechanism such that the rectangular sheet (2) does not bend and is optionally tensioned.

In certain embodiments, during use, the transverse rods (4) or a part thereof rest on the brackets (6) of an oven.

In other embodiments, during use, the ends (32) of the longitudinal rods (3) rest on the brackets (6) of an oven.

In further specific embodiments, the oven shelves further comprise one or more support elements (5) which are located under the sheet (2) during use and which rest on or are connected to the transverse rods (4).

Another aspect of the invention relates to methods for assembling an oven shelf (1). Such a method comprises the following steps:
  providing a rectangular sheet (2), of a heat-resistant woven cloth, covered or impregnated with a non-stick layer, which has a loop-shaped border (21) along the length on two opposite sides,
  arranging longitudinal rods (3) in the loop-shaped borders of the sheet (2), wherein the length of these rods is matched to the width of the oven, and wherein the ends (32) of the longitudinal rods (3) protrude out of the borders of the sheet (2), and
  arranging two transverse rods (4) on the ends (32) of the adjustable longitudinal rods (3), wherein the length of the transverse rods (4) is matched to the dimensions of the sheet (2) such that the sheet (2) is tensioned between the longitudinal rods (3).

In certain embodiments, the matching of the length of the longitudinal rods (3) is achieved by the use of telescopically extensible longitudinal rods (3).

In certain embodiments, the transverse rods (4) are foldable.

In specific embodiments, this method additionally comprises applying one or more support elements (5), wherein, during use, the support elements (5) are located under the sheet (2) and the support elements (5) rest on the transverse rods (4) or are connected thereto. When transverse rods are used which have a U shaped bend in the middle, the bend itself becomes a support element.

A further aspect of the present invention relates to the use of a rectangular sheet (2), of a heat-resistant woven cloth covered or impregnated with a non-stick layer, which has a loop-shaped border along the length on two opposite sides, as the base of an adjustable oven shelf (1) as described above. Said sheets may be used as a replacement element if a sheet has worn down.

BRIEF DESCRIPTION OF THE DRAWINGS

FIG. 1.

FIG. 1A shows a diagrammatic representation of an embodiment of the oven shelves (1) of the present invention (top view). Longitudinal rods (3) fit into the border (21). of the sheet (2) which is fastened The rods (3) have a part (31) which is located in the border and ends (32) which protrude from the sheet (2). The ends (32) of the longitudinal rods fit onto the transverse rods (4).

FIG. 1B shows a cross section along the axis a-a', in which the loop-shaped border (21) of the sheet (2) is visible.

FIG. 2 shows a diagrammatic representation of two embodiments of the oven shelves (1) of the present invention.

In FIG. 2A, the transverse rods (4) rest on the brackets (6) of an oven.

In FIG. 2B, the ends (32) of the longitudinal rods (3) rest on the brackets (6) of an oven.

DETAILED DESCRIPTION OF THE INVENTION

Figure 3:
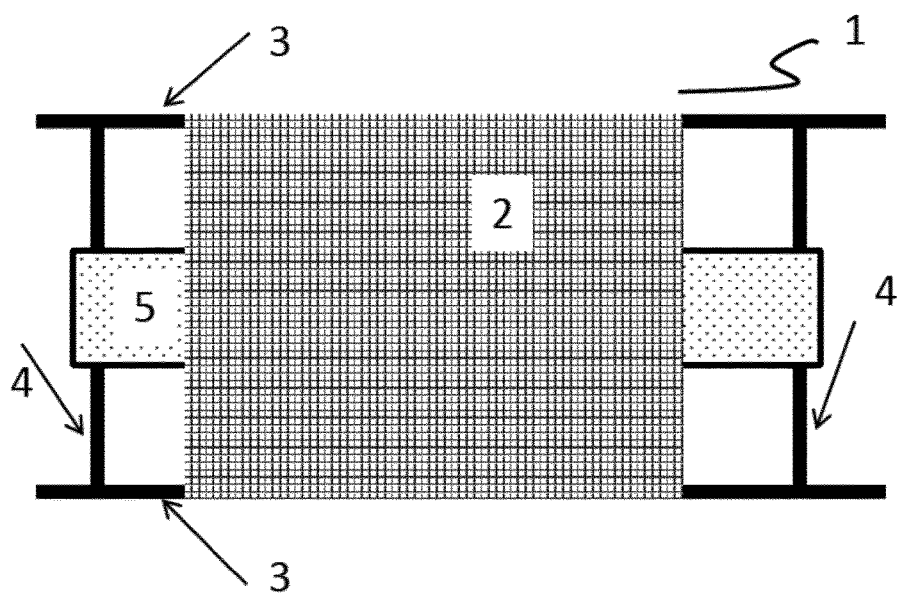
FIG. 3 shows a diagrammatic representation (top view) of an embodiment of oven shelves (1) having a support element (5), in which the support element is located under the sheet (2) and rests on the upper side of the transverse rods (4).

In the context of the present invention, "sheet" refers to a heat-resistant woven fabric covered or impregnated with a heat-resistant non-stick material which is not electrically conductive.

The woven fabric is typically a fibreglass cloth. Materials such as aramid (Kevlar™) or having similar features are equally suitable.

The non-stick material is typically polytetrafluoroethylene (PTFE) (known as Teflon™) or another heat-resistant material having a low coefficient of friction, such as fluorinated ethylene propylene (FEP) or perfluoroalkoxy (PFA).

The thickness of the sheet varies as a function of the desired bearing force of the oven shelf and is typically between 0.05 mm and 0.5 mm. Fibreglass sheets containing Teflon of the "5 mill" and "10 mill" type which are commonly used commercially have a thickness in the range from 0.1 to 0.25 mm.

Depending on the envisaged application the sheet may be a flat planar water-impermeable sheet entirely coated with the non-stick material. Alternative the sheet contains punched-out perforations.

Perforations can also be provided by using an open woven or non-woven fabric. Typically this a woven mesh of glass fibre strips with a width of 1 to mm 6, and a holes with a square, rectangular or hexagonal openings with a diameter of between 1 and 5, up to 10 mm.

The degree of perforation can be equal over the entire sheet. Alternatively, the area of the sheet which fits around the rods may have no perforations, and the region where food is positioned is perforated. This may be particularly suitable for items such as sandwiches where aeration throughout the sheet is desired. Such sheets can be made of two different types of material, e.g. two non-permeable parts which fit around the two rods and form the loops, with in-between them a perforated sheet which is sealed by welding to the non-permeable parts.

Rods which are arranged in the loop-shaped borders of a sheet and which are located at the back and front of the oven shelf during use in the oven are referred to as "longitudinal rods" in the context of the present invention. In certain embodiments, longitudinal rods are adjustable in length.

The rods which, during use of the shelf, are located in the vicinity of, or on, the brackets on the left-hand and right-hand sides of the oven are referred to as "transverse rods" in the context of the present invention. The transverse rods, optionally in combination with a support element, ensure that the sheet is tensioned by attachment to the longitudinal rods.

"Support element", in the context of the present invention, refers to flat elements which are located under the sheet during use of the shelf and which interact with the transverse rods on the left-hand and right-hand sides. The support elements prevent the sheet from sagging under heavy loads. In specific embodiments, the shape of the transverse rods makes that part of these acts as support element (see for an example in FIG. 4).

For the oven dish of the present invention, a rectangular or square section of a sheet is folded back along its entire length on two opposite sides and welded or stitched over a width of +/−10 to 20 mm. The welding of fibreglass covered with Teflon is known from the process of making conveyor belts endless in the intended material in the food industry and is achieved by heating the Teflon under high pressure to temperatures of approximately 450° C. By means of the welding or stitching, a loop-shaped border is formed on the two opposite sides of the sheet. The weld seam which is obtained withstands the pulling force which is exerted when the sheet is subsequently tensioned, and is sufficiently strong to bear the weight of an oven dish.

During welding, it is ensured that the sheet is folded down sufficiently accurately so that the sheet still has a rectangular/square shape following the welding.

Oven shelves of the present invention are obtained by assembling the sheet having the two loop-shaped borders in a frame comprising a minimum of four rods (two longitudinal rods and two transverse rods as defined above). In specific embodiments, several transverse rods are used in order to obtain a more stable construction which is, however, still simple to assemble and disassemble.

These rods should be suitable for use in a conventional hot air oven or microwave oven (heat-resistant and food-safe) and are typically made of metal, preferably of rustproof metal or aluminium. Other ferrous and non-ferrous metals are also suitable.

The rods should also offer sufficient mechanical strength so that the sheet can be tensioned in a frame and the assembled oven shelf can be loaded with food or with an empty or filled food receptacle.

Longitudinal rods usually have a circular diameter, at least over part of the length of the rods, in order to fit into the rounded shape of the loop-shaped border of the sheet in an optimum manner. The use of rods having a polygonal shape (square, rectangular, hexagonal), in particular at the ends of a longitudinal rod, is not excluded.

Transverse rods typically have a round diameter. In certain embodiments, they have a flat underside, at least over part of the length, when the transverse rods rest on the brackets.

Longitudinal rods are arranged in the loops which are located on the opposite sides of the sheet. The length of these rods is preferably adjustable so that the assembled oven shelf can fit onto the brackets of any type of oven. As a result, the oven shelf can be used in ovens of different widths.

If the longitudinal rods are not adjustable in length, the oven shelf will only be able to be used in ovens of one size. This may be sufficient for those applications where it is only the purpose to use a set of shelves for use in the same oven.

A longitudinal rod may comprise, for example, two or more parts which are connected and adjustable to the desired length. This may be achieved, for example, by means of a screw thread, or may be achieved by using rods which fit tightly over one another and are thus telescopically extensible. Upon assembly of the shelf and tensioning of the sheet, a lateral pressure is exerted on the extensible parts and they do not move with respect to one another.

In another, alternative embodiment, several elements are placed onto one another in order to create a longitudinal rod of a desired length.

In order to avoid the sheet sagging like a stretcher when it is loaded, the longitudinal rods are fixed at a set distance from one another by transverse rods which reversibly fit onto the longitudinal rods. As a result, the oven shelf can be disassembled after use so that it takes up little space when it is not in use.

Two possibilities for reversibly attaching longitudinal rods to transverse rods are:

1) the longitudinal rods have openings into which an end or protrusion of a transverse rod fits.

2) the transverse rods have openings into which an end or protrusion of a longitudinal rod fits.

Said openings on one rod and the complementary elements on the other rod may have various configurations. In certain embodiments, the openings and complementary elements have a polygonal shape (triangular, rectangular, hexagonal, etc.) so that the rods are unable to rotate after assembly.

Figure 4:
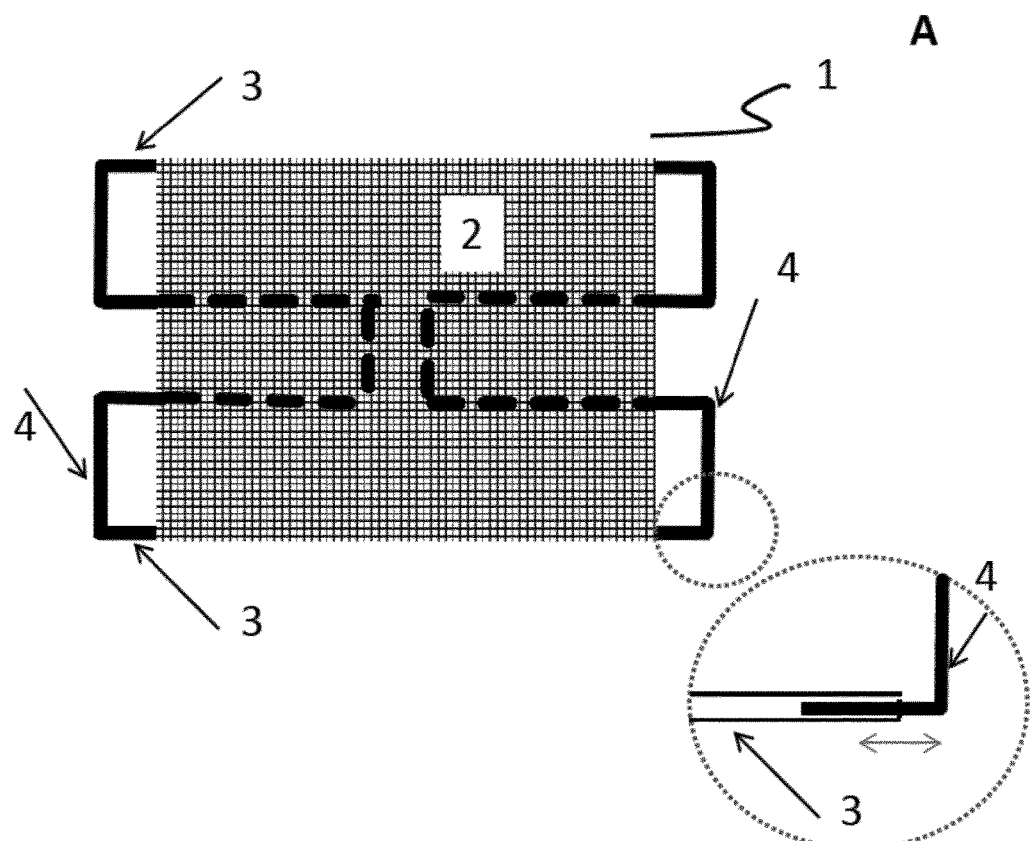
FIG. 4A shows a diagrammatic representation (top view) of an embodiment of an oven shelf wherein each transverse rod (4) has a U-shape extension which extends under the sheet (2) (part under the sheet in dashed line). The detail in the circle shows that rod (4) can slide into hollow rod (3) to obtain the designed dimensions of shelf to fit in the oven.
FIG. 4B shows an embodiment of a shelf, positioned upside down to show the U shaped bend, which forms part of the transverse rods (2) and supports the sheet (2). The U shaped bends provides a tension.
Figure 4:
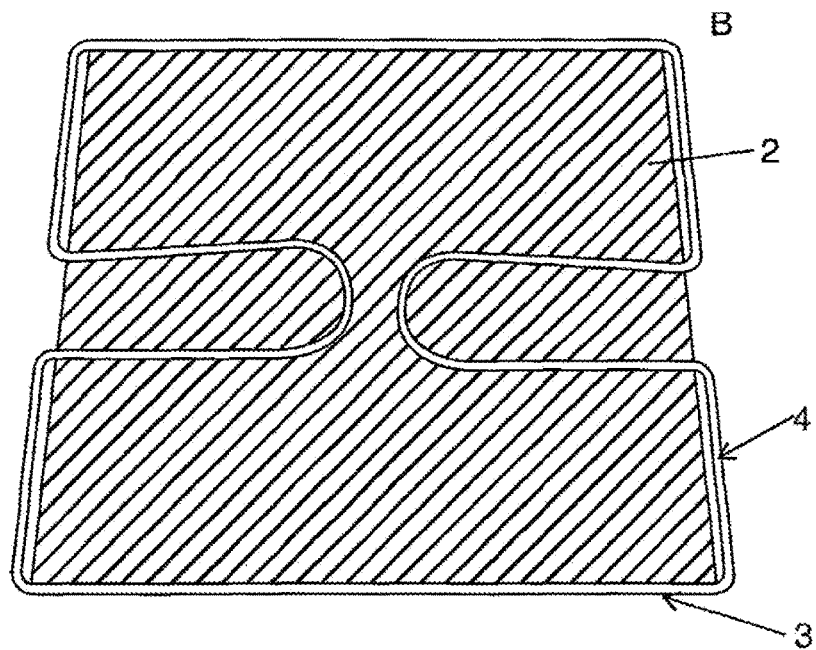

An example is shown in FIG. 4, wherein the transverse rods have a 90° curve at the end and can slide into hollow longitudinal rods.

For using the oven shelf, it is advantageous if the sheet is completely flat so that food does not slide or roll towards the centre of the sheet.

The sheet is preferably lightly tensioned. The length, and the shape of the transverse rods determines how strongly the sheet is tensioned.

When using a transverse rod which is not adjustable in length, the length should be carefully selected in order to ensure, on the one hand, that the sheet does not sag or is sufficiently tensioned and, on the other hand, to ensure that the frame can be assembled with the required ease of use.

In certain embodiments, transverse rods are adjustable in length and the sheet is tensioned after the frame has been assembled. This makes it possible to ensure that the sheet is uniformly tensioned, even if the sheet is not completely rectangular.

In certain embodiments, a spring is located in the transverse rod, which spring can be compressed when the frame is assembled.

In other embodiments, the transverse rods can fold so that they can be used in the folded state in order to assemble the frame, after which they are folded out and tension the sheet. An example hereof is shown in FIG. 4, wherein a U-shaped bend in the transverse rods allows to manually compress the legs of this bend upon assembly. Upon release the sheet gets tensioned in the frame.

When the oven shelf is placed in the oven, it should rest on the brackets of the oven.

In a certain embodiment, the ends of the longitudinal rods rest on the brackets of the oven; the longitudinal rods optionally have transverse elements at the ends in order to better rest on the brackets of the oven. The transverse rods serve merely to position the longitudinal rods and to keep the sheet flat or tensioned (this type is represented diagrammatically in FIG. 2a).

In other embodiments, the transverse rods rest with their entire length, or a significant part thereof, on the brackets of the oven. In the embodiment in which the transverse rods rest with their entire length on the brackets of the oven, it is easier to place the shelf into or remove it from the oven.

For the use of relatively heavy receptacles, certain embodiments are provided in which an extra support is arranged under the sheet which rests on the transverse rods (so-called support element). In the simplest version, this may be achieved by providing one or more elongate slats, the edges of which rest on the transverse rods. In order to prevent these support elements from moving, it can be ensured that a support element interacts with the transverse edge, for example by means of the presence of ridges on the support element or by means of other attachment points.

Figure 5:
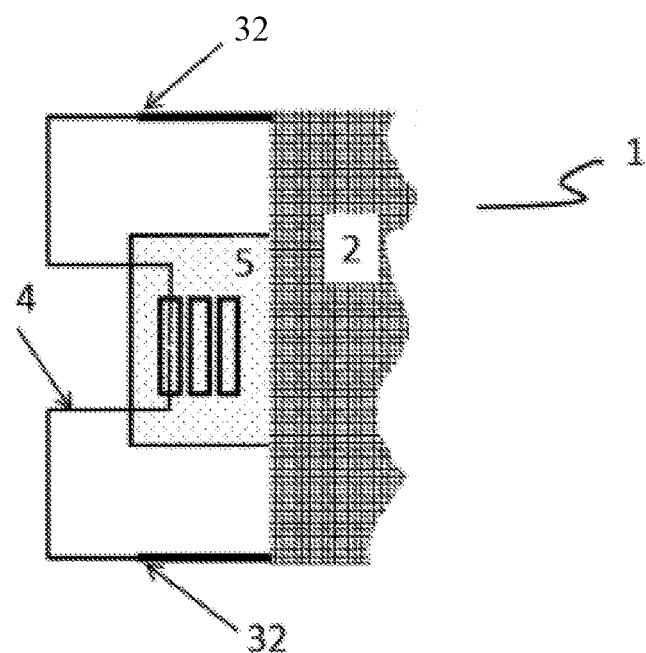
FIG. 5 shows a diagrammatic representation (top view) of a part of an embodiment, having a support element (5), of the oven shelves (1). In this case, two U-shaped transverse rods (4) fit, at one side, into a longitudinal rod (3) and, at the other side, into the support element (5).

In another specific embodiment, support elements interact with the transverse rods so that they form part of the system for tensioning the sheet. A diagrammatic example of this is illustrated in FIG. 5. In this case, the ends of the transverse rods fit into connections on the support element. The dimensions of transverse rods and support element are such that the sheet is tensioned upon assembly. In the configuration of FIG. 4, the assembled oven shelf has U-shaped transverse rods and the support element has several connections, so that the oven shelf can be used with adjustable longitudinal rods.

In another embodiment, illustrated in FIG. 4, a transverse rod (4) contains in the middle a U-shaped bend, which extends under the sheet. Such a rod is flexible which helps to tension the sheet between the transverse rods. Furthermore, the U shaped parts which extend under the sheet provide additional physical support when the sheet is charged with an heavy oven tray or the like.

Example 1

A Teflon-coated fibreglass of 33×39 cm having a thickness of 0.13 mm is folded down by 4 cm on the longest sides and welded at the edge over a width of 15 mm. A stainless steel rod (longitudinal rod) having a diameter of 8 mm is introduced into both of the loops which are created. The longitudinal rod comprises two parts which fit into one another telescopically, so that the rod is adjustable between 40 and 49 cm.

Transverse rods have a length of 36 cm and, at a distance of 31 cm, holes are located into which the longitudinal rods fit and the sheet is tensioned.

Example 2

Figure 6:
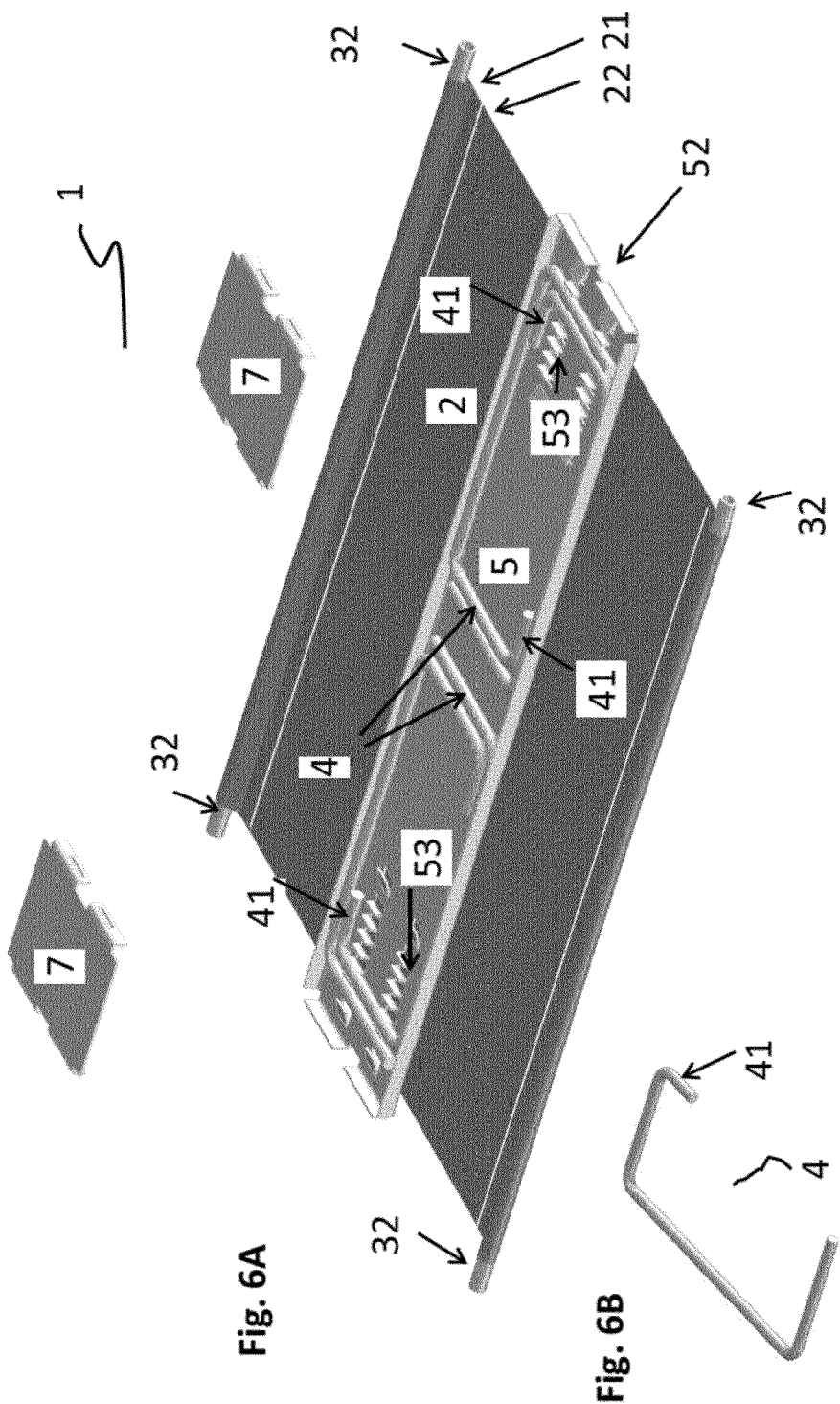
FIGS. 6 and 7 show an embodiment (bottom view) of an oven shelf having a support element (5). The various parts are discussed in detail in Example 2.
Figure 7:
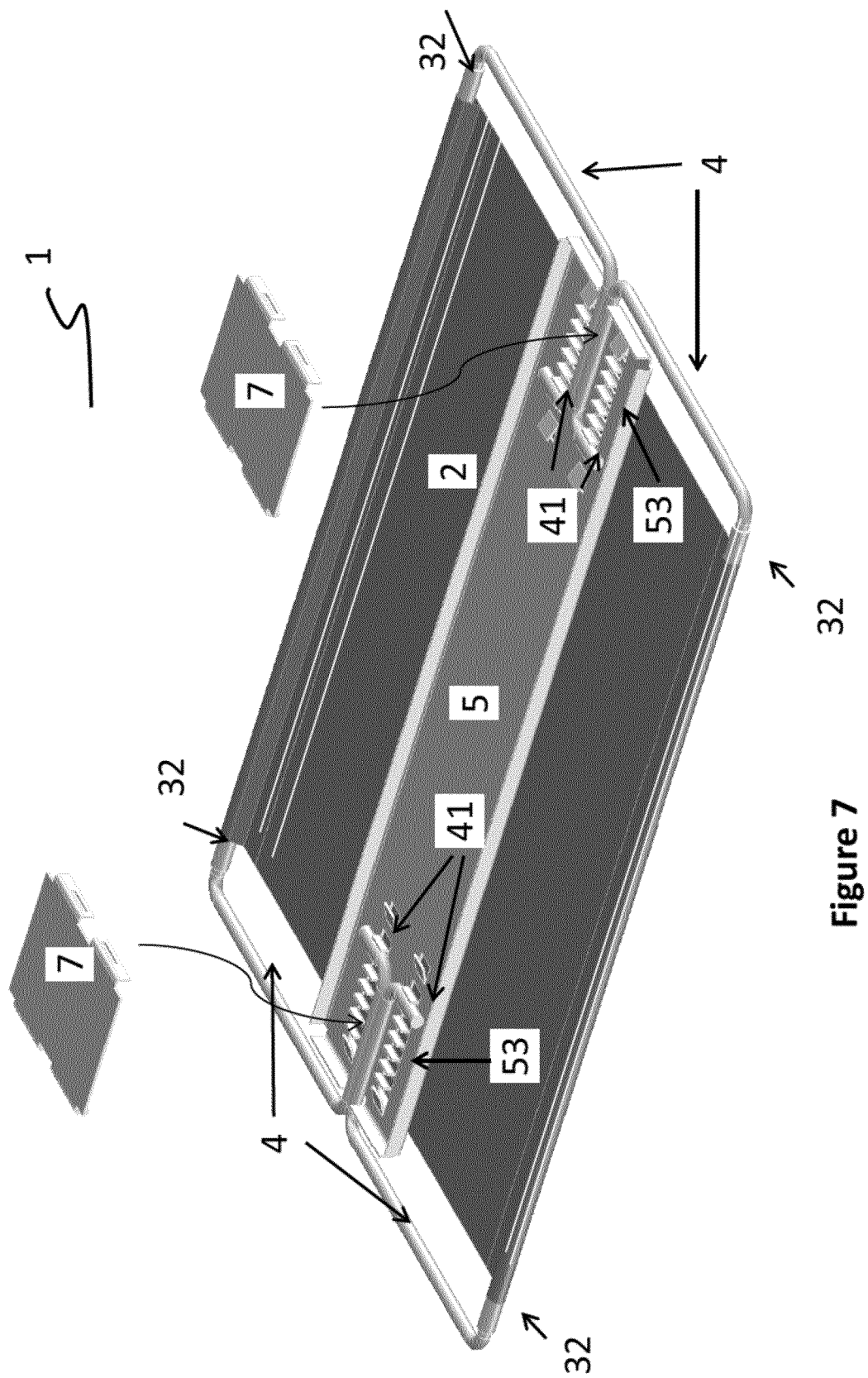

FIGS. 6 and 7 show a model of an oven shelf having a support element.

FIG. 6 shows the various elements upon assembly of the shelf. Longitudinal rods (3) have already been inserted into the loop-shaped borders (21) of the sheet (2). The hollow ends (32) are visible. The longitudinal rods are telescopically adjustable in length; this part is located in the border and is not visible.

Support element (5) rests on the sheet, but is not attached to the sheet. The support element has folded-over outer edges (51) which increases the mechanical strength. A recess (52) is provided in the centre of the edge on the width side. Near the end, the support element also has partially punched-out and folded-over upright edges (53).

Four transverse rods (4) are in the support element. A transverse rod is shown in detail in FIG. 6b. The transverse rods have a U-shape with two legs, with 1 of the legs being folded inwards (41).

The function of the optional cover plates (7) is discussed below.

FIG. 7 shows the assembled shelf (cover plates 7 are shown separately in order to indicate the interaction between transverse rods and support element).

The straight leg of the transverse rods fits into the hollow ends of the longitudinal rods. The support element (5) rests in the centre of the sheet, but is not attached to the sheet.

The transverse rods are inserted into the recess (52); the width of the recess allows two transverse rods to fit into this recess next to one another.

The folded-over leg (41) of the transverse rod hooks in behind the edges (53). This keeps the various parts of the shelf in their place.

The length of the transverse rods ensures that they fit tightly into the support element and tension the sheet.

Subsequently, cover plates (7) may optionally be placed over the fastening mechanism. These ensure that it is not possible to accidentally release the fastening mechanism during use and manipulation of the shelf, meaning that the shelf would collapse.

The shelf as illustrated reveals the underside of the shelf in order to be able to show the fastening mechanism.

During use, this is turned around, so that the sheet is on the top side and the support plate is under the sheet.

The invention claimed is:

1. A kit for assembling an oven shelf which is able to be disassembled after use, comprising:
   a rectangular sheet of a glass fiber woven cloth or fabric covered or impregnated with a non-stick layer, which has a loop-shaped border along the length on two opposite sides,
   two heat-resistant longitudinal rods which fit into the loop-shaped borders of the sheet and which are telescopically extendable, and
   at least two heat-resistant transverse rods which removably fit on the longitudinal rods, whereby the rectangular sheet is tensioned upon assembly,
   wherein the two heat resistant longitudinal rods are configured to allow a variety of shelf widths.

2. The kit according to claim 1, wherein the longitudinal rods are adjustable in length.

3. The kit according to claim 1, wherein the sheet is porous or wherein the sheet is an open fibre based mesh.

4. The kit according to claim 1, wherein longitudinal rods and/or transverse rods are made of a non-ferrous metal.

5. The kit according to a claim 1, wherein longitudinal rods and/or transverse rods are made of rustproof metal or aluminum.

6. The kit according to claim 1, wherein the transverse rods have a U-shaped bend, whereby the end of this bend is positioned under the sheet.

7. The kit according to claim 1, which further comprises one or more support elements which are located under the sheet during use of the shelf and rest on or are connected to the transverse rods.

8. An assembled oven shelf, comprising:
   a rectangular sheet of a glass fiber woven cloth or fabric covered or impregnated with a non-stick layer, which has a loop-shaped border along the length on two opposite sides,
   two heat-resistant longitudinal rods which are telescopically extendable and which are located in the loop-shaped borders of the sheet, and the ends of which protrude from the sheet, and two or more heat-resistant transverse rods which removably fit on the longitudinal rods, wherein the transverse rods are of a suitable length or have a tensioning mechanism such that the rectangular sheet does not bend and is optionally tensioned,
   wherein the two heat resistant longitudinal rods are configured to allow a variety of shelf widths.

9. The oven shelf according to claim 8, wherein, during use, the transverse rods or a part thereof rest on the brackets of an oven.

10. The oven shelf according to claim 8, wherein, during use, the ends of the longitudinal rods rest on the brackets of an oven.

11. The oven shelf according to claim 8, further comprising one or more support elements which are located under the sheet during use and which rest on or are connected to the transverse rods.

12. A method for assembling an oven shelf comprising the steps of:
   a) providing a rectangular sheet of a glass fiber woven cloth or fabric covered or impregnated with a non-stick layer, which has a loop-shaped border along a length on two opposite sides,
   b) arranging longitudinal rods in the loop-shaped borders of the sheet, wherein a length of these rods is matched to a width of an oven, and wherein the ends of the longitudinal rods protrude out of the borders of the sheet, wherein the matching of the length of the longitudinal rods is achieved by the longitudinal rods being telescopically extendible, and
   c) arranging two transverse rods on the adjustable longitudinal rods, wherein a length of the transverse rods is matched to dimensions of the sheet such that the sheet is tensioned between the longitudinal rods.

13. The method according to claim 12, further comprising the step of applying one or more support elements, wherein, during use, the support elements are located under the sheet and the support elements rest on the transverse rods or are connected thereto.

14. The method according to claim 12, wherein the transverse rods are foldable.

15. A method of using a rectangular sheet of a heat-resistant woven cloth or fabric covered or impregnated with a non-stick layer, which has a loop-shaped border along the length on two opposite sides, as the base of an adjustable oven shelf according to claim 8.

16. An oven shelf comprising:
   a rectangular sheet of a glass fiber woven cloth or fabric covered or impregnated with a non-stick layer, which has a loop-shaped border along the length on two opposite sides,
   longitudinal rods in the loop-shaped borders of the sheet, which are longitudinally extendable, wherein the length of these rods is adjustable to the width of the oven, and wherein the ends of the longitudinal rods protrude out of the borders of the sheet, and two transverse rods on the adjustable longitudinal rods, wherein the length of the transverse rods is matched to the dimensions of the sheet such that the sheet is tensioned between the longitudinal rods, wherein, the length of the longitudinal rods is adjustable to the width of the oven by the use of telescopically extensible longitudinal rods.

\* \* \* \* \*